United States Patent
Hoshi et al.

(10) Patent No.: US 11,420,628 B2
(45) Date of Patent: Aug. 23, 2022

(54) VEHICLE CONTROL METHOD AND VEHICLE CONTROL DEVICE

(71) Applicant: NISSAN MOTOR CO., LTD., Yokohama (JP)

(72) Inventors: Kiyoshi Hoshi, Kanagawa (JP); Naoki Nakada, Kanagawa (JP); Kenichi Gotou, Kanagawa (JP); Takayuki Shimizu, Kanagawa (JP); Yohei Nakamura, Kanagawa (JP)

(73) Assignee: NISSAN MOTOR CO., LTD., Yokohama (JP)

(*) Notice: Subject to any disclaimer, the term of this patent is extended or adjusted under 35 U.S.C. 154(b) by 0 days.

(21) Appl. No.: 17/312,546

(22) PCT Filed: Dec. 13, 2018

(86) PCT No.: PCT/JP2018/045804
§ 371 (c)(1),
(2) Date: Jun. 10, 2021

(87) PCT Pub. No.: WO2020/121465
PCT Pub. Date: Jun. 18, 2020

(65) Prior Publication Data
US 2022/0041164 A1    Feb. 10, 2022

(51) Int. Cl.
*B60W 30/18* (2012.01)
*B60W 10/06* (2006.01)
(Continued)

(52) U.S. Cl.
CPC ...... *B60W 30/18127* (2013.01); *B60W 10/06* (2013.01); *B60W 10/08* (2013.01); *B60W 20/40* (2013.01); *B60W 20/50* (2013.01); *B60W 2510/0657* (2013.01); *B60W 2510/083* (2013.01); *B60W 2510/244* (2013.01)

(58) Field of Classification Search
None
See application file for complete search history.

(56) References Cited

U.S. PATENT DOCUMENTS

| | | |
|---|---|---|
| 8,165,743 B2 | 4/2012 | Oyama |
| 2008/0183361 A1 | 7/2008 | Oyama |

(Continued)

FOREIGN PATENT DOCUMENTS

| | | |
|---|---|---|
| JP | 2007-182204 A | 7/2007 |
| JP | 2008-187842 A | 8/2008 |

(Continued)

*Primary Examiner* — Todd Melton
*Assistant Examiner* — Jason R Roberson
(74) *Attorney, Agent, or Firm* — Foley & Lardner LLP

(57) ABSTRACT

A vehicle control device controls a vehicle including a drive motor connected to a rotation shaft of wheels, a battery that supplies electricity to the drive motor, and an internal combustion engine connected to the drive motor. The vehicle is equipped with, as traveling modes, a normal mode, and an eco-mode having a larger regenerative braking force than the normal mode obtained such that rotational energy of the wheels is converted into electrical energy. A controller stops the internal combustion engine and switches from the normal mode to the eco-mode when detecting at least an abnormality in the internal combustion engine during traveling of the vehicle.

6 Claims, 9 Drawing Sheets

(51) Int. Cl.
  *B60W 20/50* (2016.01)
  *B60W 10/08* (2006.01)
  *B60W 20/40* (2016.01)

(56) References Cited

U.S. PATENT DOCUMENTS

2010/0076657 A1* 3/2010 Jinno .................. B60L 7/14
                                                701/70
2011/0125356 A1* 5/2011 Takahashi ............ B60W 20/50
                                                701/22
2015/0210266 A1* 7/2015 Yang .................. B60K 6/52
                                                701/22

FOREIGN PATENT DOCUMENTS

| JP | 2016-49895 A | 4/2016 |
| JP | 2016-130082 A | 7/2016 |
| JP | 2017-99245 A | 6/2017 |

* cited by examiner

FIG. 9

|  | REGENERATIVE BRAKING FORCE | RESPONSIVENESS OF DRIVE FORCE |
|---|---|---|
| ECO-MODE | GREATER THAN NORMAL MODE | SLOWER THAN NORMAL MODE |
| NORMAL MODE | NORMAL | INTERMEDIATE BETWEEN ECO-MODE AND S-MODE |
| S-MODE | GREATER THAN NORMAL MODE (EQUAL TO ECO-MODE) | FASTER THAN NORMAL MODE |

VEHICLE CONTROL METHOD AND VEHICLE CONTROL DEVICE

TECHNICAL FIELD

The present invention relates to a vehicle control method and a vehicle control device.

BACKGROUND ART

A technique is known that detects abnormality caused in a power generator mounted on a vehicle (Patent Literature 1). The technique disclosed in Patent Literature 1 detects whether any abnormality is caused in the power generator in accordance with a target rotation rate and an actual rotation rate.

CITATION LIST

Patent Literature

Patent Literature 1: Japanese Unexamined Patent Application Publication No. 2016-49895

SUMMARY OF INVENTION

Technical Problem

The vehicle needs to be immediately stopped when an abnormality is detected in a device (not limited to the power generator but including an internal combustion engine, for example) mounted on the vehicle. Patent Literature 1 makes no mention regarding this point.

To solve the conventional problem described above, the present invention provides a vehicle control method and a vehicle control device capable of stopping a vehicle within a short period of time when an abnormality is detected in a device mounted on the vehicle.

Technical Solution

A vehicle control method according to an aspect of the present invention controls a vehicle including a drive motor connected to a rotation shaft of wheels, a battery that supplies electricity to the drive motor, and an internal combustion engine connected to the drive motor. The vehicle is equipped with, as traveling modes, a normal mode, and an eco-mode having a larger regenerative braking force than the normal mode obtained such that rotational energy of the wheels is converted into electrical energy. The vehicle control method stops the internal combustion engine and switches from the normal mode to the eco-mode when detecting at least an abnormality in the internal combustion engine during traveling of the vehicle.

Advantageous Effects

The present invention can stop the vehicle within a short period of time when an abnormality is detected in a device mounted on the vehicle.

BRIEF DESCRIPTION OF DRAWINGS

FIG. 9 is a diagram explaining a normal mode, an eco-mode, and an S-mode.

DESCRIPTION OF EMBODIMENTS

Figure 1:
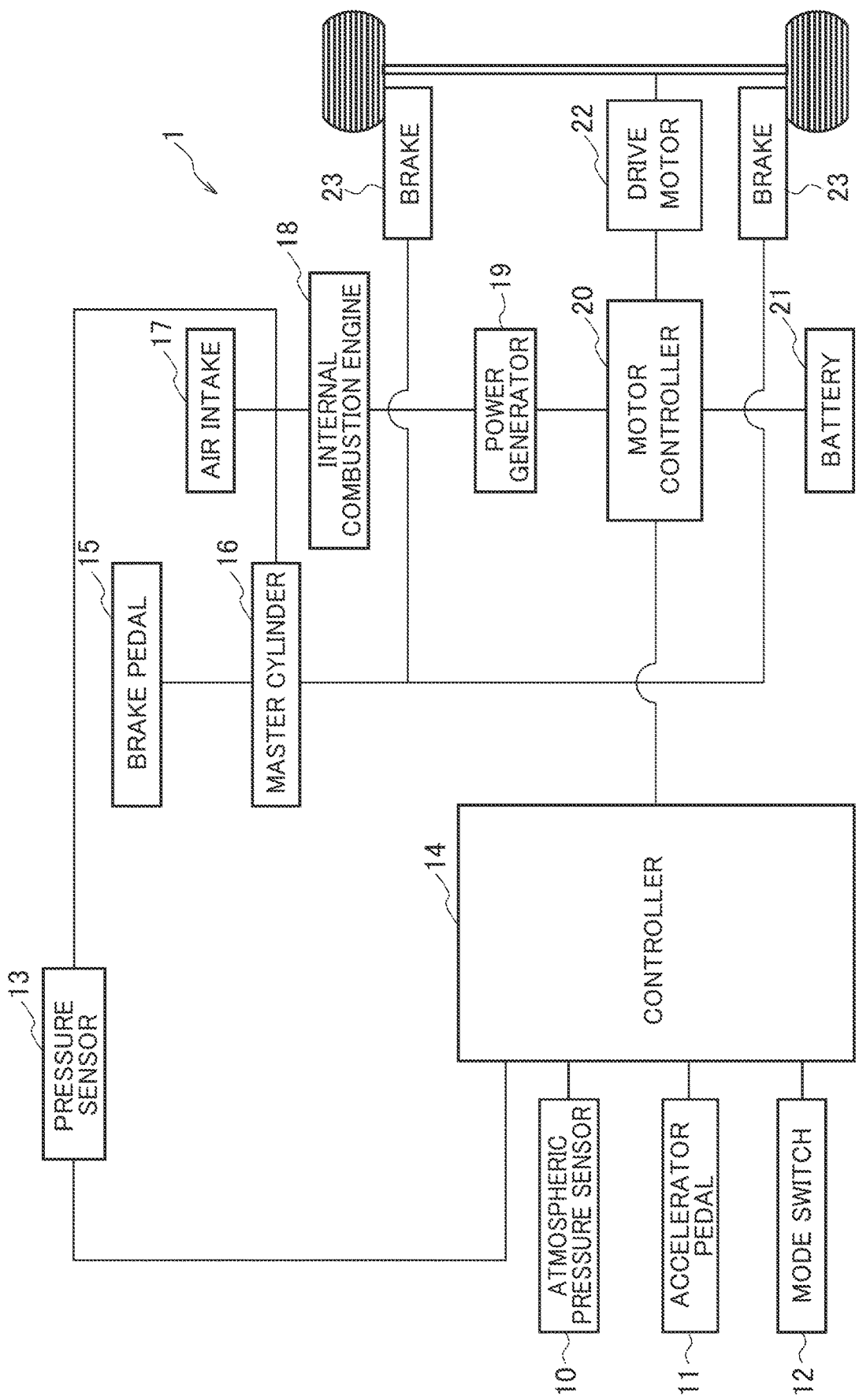
FIG. 1 is a schematic configuration diagram of a vehicle control device according to an embodiment of the present invention.

Hereinafter, an embodiment according to the present invention is described with reference to the drawings. The same elements illustrated in the drawings are denoted by the same reference numerals, and overlapping explanations are not made below.

<Configuration Example of Vehicle Control Device>

A configuration example of a vehicle control device 1 according to the present embodiment is described below with reference to FIG. 1. As illustrated in FIG. 1, the vehicle control device 1 includes an atmospheric pressure sensor 10, an accelerator pedal 11, a mode switch 12, a pressure sensor 13, a controller 14, a brake pedal 15, a master cylinder 16, an air intake 17, an internal combustion engine 18, a power generator 19, a motor controller 20, a battery 21, a drive motor 22, and brakes 23.

The vehicle control device 1 may be mounted on either a vehicle having an autonomous driving function or a vehicle without equipped with an autonomous driving function. The vehicle control device 1 may be mounted on a vehicle capable of switching between autonomous driving and manual driving. The term "autonomous driving" as used in the present embodiment refers to a state in which at least any of actuators including the brakes, the accelerator, and the steering wheel is controlled without operation made by the occupant. The autonomous driving thus can include a state in which other actuators are operated by the occupant. The autonomous driving also only needs to be a state in which any control such as acceleration/deceleration control and lateral positioning control is executed. The term "manual driving" as used in the present embodiment refers to a state in which the occupant operates the brakes, the accelerator, and the steering wheel, for example.

The present embodiment is illustrated with the case as an example in which the vehicle control device 1 is mounted on a vehicle without equipped with the autonomous driving function.

The atmospheric pressure sensor 10 measures and outputs an atmospheric pressure to the controller 14. A stepping force acting on the accelerator pedal 11 applied by the driver is transmitted to the controller 14.

The mode switch 12 is a switch for switching between a normal mode and an eco-mode. The controller 14 switches between the normal mode and the eco-mode in accordance with the switching operation made by the driver. The difference between the normal mode and the eco-mode is described in detail below.

A stepping force acting on the brake pedal 15 applied by the driver is transmitted to the brakes 23 via the master cylinder 16, and is used as braking force. The brakes 23 according to the present embodiment function as a hydraulic mechanical brake, and a regenerative brake that causes regenerative braking force obtained upon conversion of rotational energy of the wheels into electrical energy.

The internal combustion engine 18 is mechanically connected to the power generator 19 via a decelerator and a shaft, for example. The power generator 19 is electrically connected to the drive motor 22 and the battery 21. The battery 21 is electrically connected to the power generator 19 and the drive motor 22. The drive motor 22 is mechanically connected to rotation shafts of the wheels (the tires).

The internal combustion engine 18 is an engine, for example. The internal combustion engine 18 introduces air through the air intake 17, and mixes the air with fuel to ignite so as to obtain the power. The internal combustion engine 18 also generates intake manifold negative pressure. The intake manifold negative pressure is used for assisting the operation of the mechanical brake.

The pressure sensor 13 measures the intake manifold negative pressure, and outputs it to the controller 14.

The power generator 19 receives the power from the internal combustion engine 18 to charge the battery 21. The power generator 19 also supplies the electricity to the drive motor 22. The battery 21 supplies the electricity to the drive motor 22. The drive motor 22 uses the electricity received from the battery 21 or the power generator 19 to drive the wheels. The drive motor 22 charges the battery 21 with the electricity obtained by the regenerative power generation. The battery 21 is, for example, but not necessarily, a lithium ion battery.

The motor controller 20 controls the internal combustion engine 18, the power generator 19, the battery 21, and the drive motor 22, for example, depending on the operation executed on the accelerator pedal 11 or the brake pedal 15 by the driver.

The connection of the motor controller 20 to the power generator 19, the drive motor 22, and the like may be, but not necessarily, made by a controller area network (CAN). The present embodiment illustrates the controller 14 independently of the motor controller 20 for illustration purposes, but a single controller may function as both the controller 14 and the motor controller 20.

The controller 14 and the motor controller 20 are each a general-purpose microcomputer including a central processing unit (CPU), a memory, and an input-output unit. A computer program is installed on the microcomputer so as to function as the vehicle control device 1. The microcomputer functions as a plurality of information processing circuits included in the vehicle control device 1 when the computer program is executed. While the present embodiment is illustrated with the case in which the software is installed to fabricate the respective information processing circuits included in the vehicle control device 1, dedicated hardware for executing each information processing as described below can be prepared to compose the information processing circuits. The respective information processing circuits may be composed of individual hardware.

<Example of Operation of Vehicle Control Device>

An example of operation of the vehicle control device 1 is described below with reference to the time chart shown in FIG. 2. The vehicle control device 1 has a function of stopping the vehicle within a short period of time when detecting an abnormality in a device mounted on the vehicle.

Figure 2:
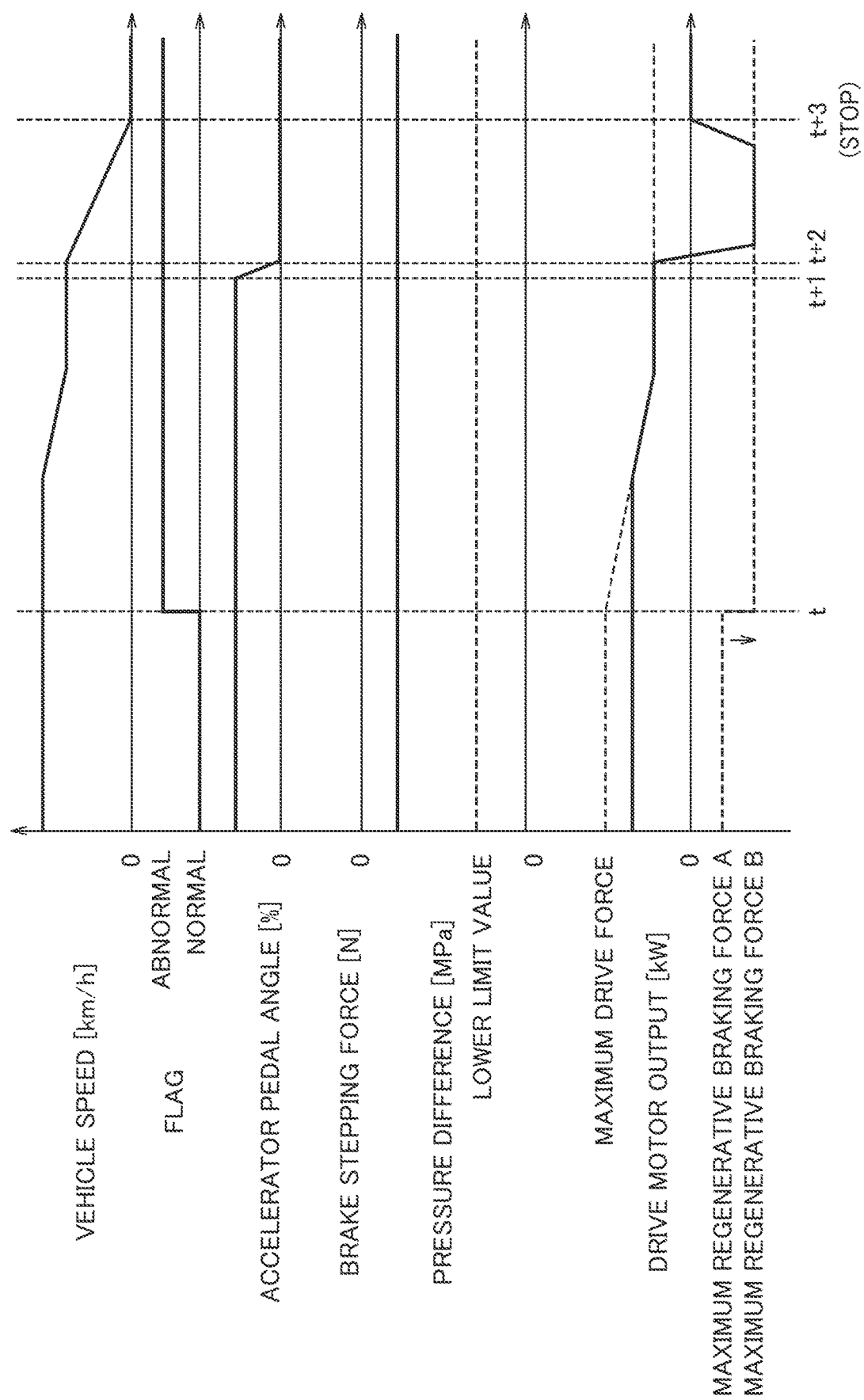
FIG. 2 is a time chart explaining an example of operation of the vehicle control device.

The vehicle is herein presumed to be traveling in the normal mode at the start point in the time chart shown in FIG. 2.

The controller 14 detects any abnormality caused in a device mounted on the vehicle. Examples of target devices include the internal combustion engine 18, the power generator 19, and a connecting mechanism (such as a shaft) mechanically connecting the internal combustion engine 18 and the power generator 19. The controller 14 may be configured to detect at least one of the abnormality in the internal combustion engine 18, the abnormality in the power generator 19, and the abnormality in the connecting mechanism mechanically connecting the internal combustion engine 18 and the power generator 19. The abnormality in the internal combustion engine 18 includes an abnormality in a sensor for controlling the internal combustion engine 18, and an abnormality in a mechanism for externally transmitting the power generated by the combustion, such as a piston and a shaft. The abnormality in the power generator 19 includes a physical abnormality in a lock, and an abnormality in an inverter. The abnormality in the connecting mechanism includes an abnormality in a shaft. These types of abnormality may be detected by a sensor (not illustrated), or may be detected in accordance with the information transmitted from the internal combustion engine 18 or the power generator 19. FIG. 2 illustrates a case in which the controller 14 is presumed to detect an abnormality in the internal combustion engine 18 at the time t.

A flag shown in FIG. 2 shifts from a normal state to an abnormal state when the controller 14 detects the abnormality in the internal combustion engine 18. The controller 14 then stops the internal combustion engine 18. The controller 14 further switches from the normal mode to the eco-mode. The difference between the normal mode and the eco-mode is described below. A regenerative braking force and responsiveness of a drive force of the drive motor 22 are preliminarily set for the normal mode and the eco-mode. The regenerative braking force is set to be greater for the eco-mode than for the normal mode. The responsiveness of the drive force is set to be slower for the eco-mode than for the normal mode. When the flag indicates the abnormal state, the controller 14 prevents the stopped internal combustion engine 18 from starting operating again. The reason for this is that, when the flag indicates the abnormal state, the power generation is not started, or the intake manifold negative pressure is not generated if the internal combustion engine 18 is shifted from the stopped state to the operating state. Causing the internal combustion engine 18 to start operating thus has no advantage during the indication of the abnormal state by the flag. The controller 14 also keeps the stopped state and prevents the internal combustion engine 18 from starting operating when the flag shifts from the normal state to the abnormal state.

When the normal mode is switched to the eco-mode, an upper limit value of the regenerative braking force increases, as shown in FIG. 2. The reason for this is that the regenerative braking force set in the eco-mode is greater than the regenerative braking force set in the normal mode, as described above. The maximum regenerative braking force A shown in FIG. 2 is the upper limit value of the regenerative braking force set in the normal mode. The maximum regenerative braking force B shown in FIG. 2 is the upper limit value of the regenerative braking force set in the eco-mode.

Figure 3:
FIG. 3 is a view showing an example of an image displayed on a screen of a meter or a navigation device.

The vehicle should be stopped immediately when the flag shifts from the normal state to the abnormal state. The controller 14 then displays an image 30 as illustrated in FIG. 3 on the screen of the meter or the navigation device so as to urge the driver to stop the vehicle promptly when the flag shifts from the normal state to the abnormal state. The image 30 illustrated in FIG. 3 is an example, and is optional. The controller 14 may provide the driver with voice notification, "Please make a stop safely", via a speaker (not illustrated) installed in the vehicle.

The driver, when receiving the notification, removes the leg from the accelerator pedal 11 (at the time t+1). The regenerative brake then starts operating at the timing at which an accelerator pedal angle reaches zero (at the time t+2). Since the regenerative braking force set in the eco-mode is greater than the regenerative braking force set in the normal mode, the vehicle is stopped within a short period of time (at the time t+3) without the operation of stepping on the brake pedal 15 made by the driver. While FIG. 2 illustrates the case in which the regenerative brake starts operating at the timing at which the accelerator pedal angle reaches zero, the timing at which the regenerative brake starts operating is not limited to this case. For example, the regenerative brake may start operating at a point at which the accelerator pedal angle reaches a predetermined value or less (at a point at which the stepping amount of the driver decreases). The predetermined value may also be used for switching between exertion and regeneration, and adjusting intensity of regenerative deceleration. The predetermined value as described above may be obtained through experiments or simulations.

The controller 14 invalidates the operation on the mode switch 12 when the flag indicates the abnormal state. The eco-mode is not switched to the normal mode when the flag indicates the abnormal state if the driver tries to switch to the normal mode. The reason for the invalidity of the operation on the mode switch 12 is to prevent the vehicle from moving.

The controller 14 gradually decreases the maximum drive force of the drive motor 22 when the flag shifts from the normal state to the abnormal state, as shown in FIG. 2. The controller 14 thus can urge the driver to stop the vehicle. A drive motor output shown in FIG. 2 indicates the exertion in a positive direction and the regeneration in a negative direction. The maximum drive force of the drive motor 22 as used in the present embodiment is defined as the largest drive force of the drive force on the exertion side that the drive motor 22 can output.

While FIG. 2 illustrates the case in which the vehicle is stopped within a short period of time without the operation of stepping on the brake pedal 15 made by the driver, the present embodiment is not limited to this case. The driver can step on the brake pedal 15 in order to stop the vehicle within a short period of time when an abnormality is detected. The processing in this example is described below with reference to the time chart shown in FIG. 4.

Figure 4:
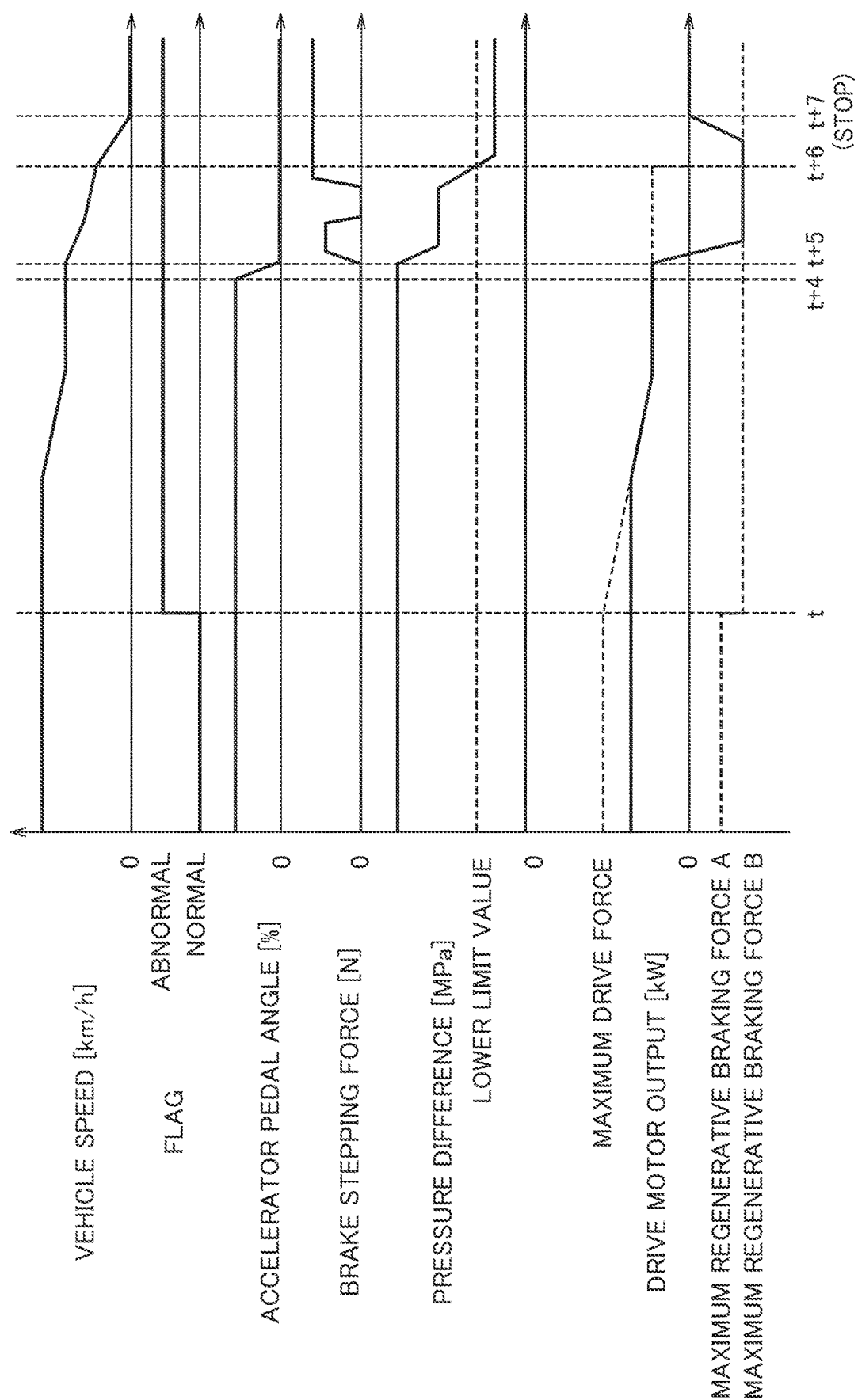
FIG. 4 is a time chart explaining another example of operation of the vehicle control device.

The vehicle is presumed to be traveling in the normal mode at the start point in the time chart shown in FIG. 4, as in the case of FIG. 2. The controller 14 is presumed to detect an abnormality in the internal combustion engine 18 at the time t, as in the case of FIG. 2. The flag then shifts from the normal state to the abnormal state, and the controller 14 stops the internal combustion engine 18 and switches from the normal mode to the eco-mode. The upper limit value of the regenerative braking force is thus increased, as in the case of FIG. 2.

The driver removes the leg from the accelerator pedal 11 (at the time t+4), and starts stepping on the brake pedal 15 (at the time t+5). As described above, the internal combustion engine 18 stops at the time t. When the user steps on the brake pedal 15, a pressure difference between the atmospheric pressure and the intake manifold negative pressure gradually decreases, as shown in FIG. 4. When the pressure deference reaches a predetermined value or lower (the lower limit value or lower), the performance of the mechanical brake decreases. The controller 14 then sets the maximum drive force of the drive motor 22 to zero when the pressure difference reaches the predetermined value or lower (at the time t+6). Since the vehicle does not start moving if the user steps on the accelerator pedal 11, the vehicle is further urged to stop. The vehicle is then stopped (at the time t+7). The predetermined value may be a typically-determined value, or may be set through experiments or simulations. The controller 14 detects the pressure difference by use of the atmospheric pressure sensor 10 and the pressure sensor 13. The atmospheric pressure used by the controller 14 is not limited to the pressure measured by the atmospheric pressure sensor 10. The controller 14 may use a standard pressure (1013.25 hPa) as the atmospheric pressure.

Figure 5:
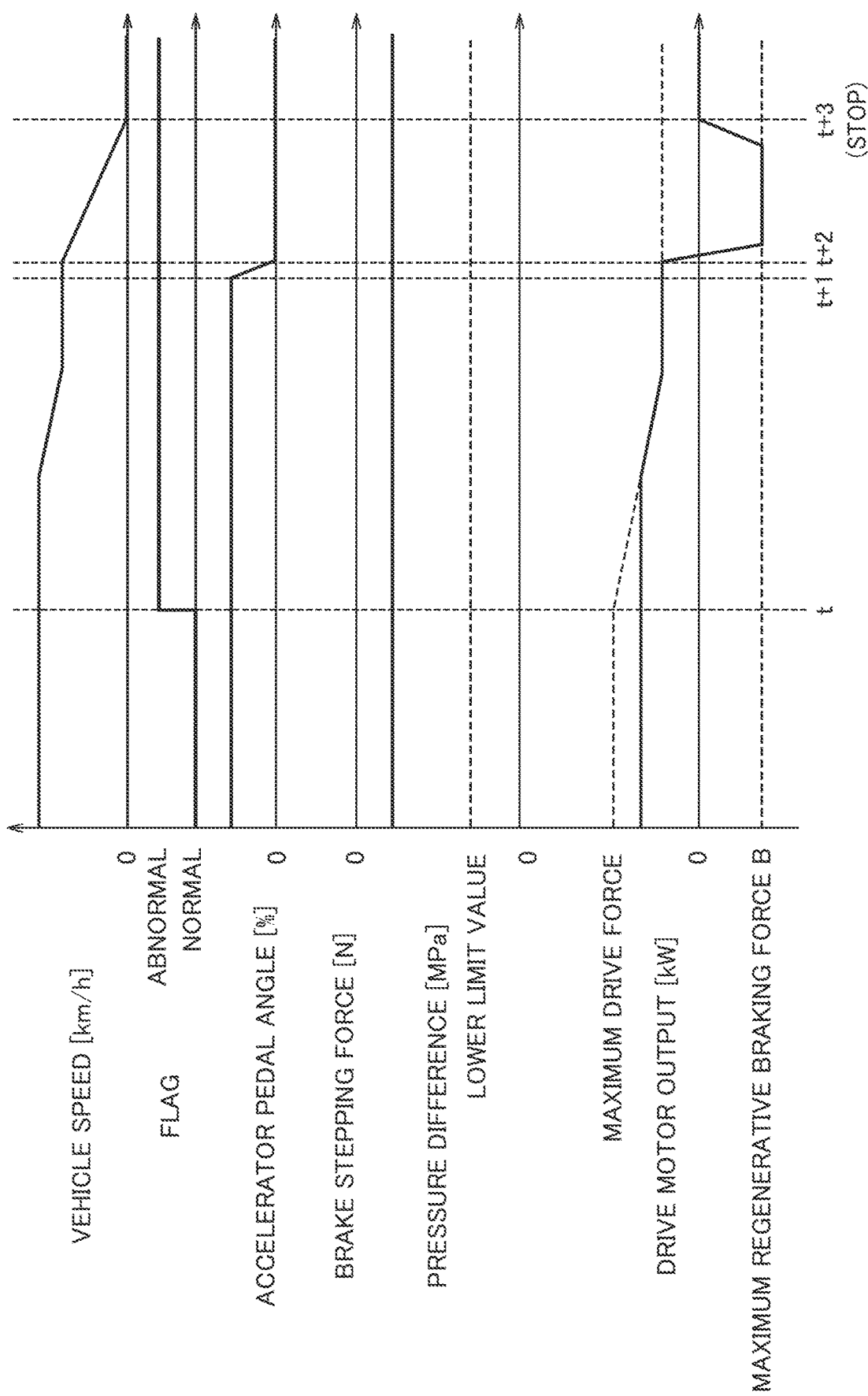
FIG. 5 is a time chart explaining still another example of operation of the vehicle control device.

When the traveling mode before the abnormality is detected is not the normal mode but the eco-mode, the vehicle control device 1 only needs to stop the vehicle while keeping the eco-mode after the detection of the abnormality, as illustrated in FIG. 5.

Figure 6:
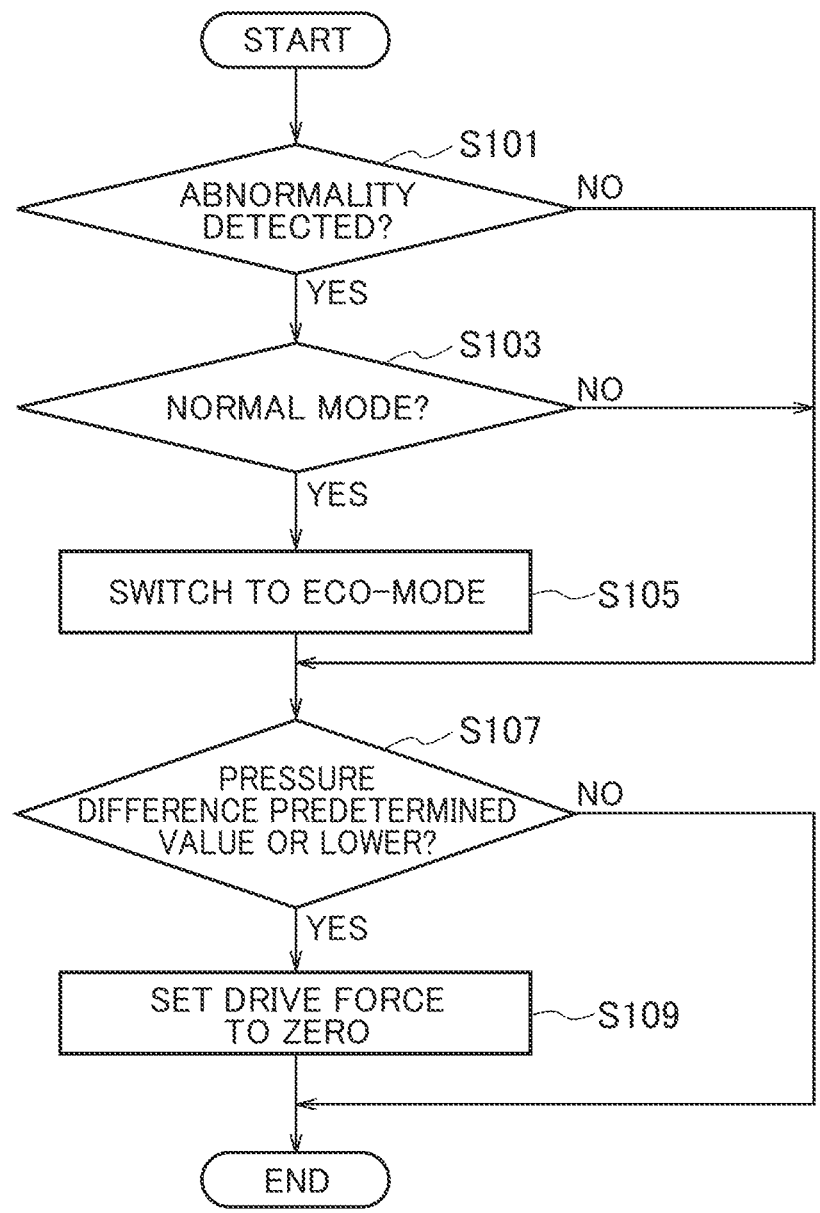
FIG. 6 is a flowchart explaining an example of operation of the vehicle control device.

Next, an example of operation of the vehicle control device 1 is described below with reference to the flowchart shown in FIG. 6.

When the controller 14 detects an abnormality in the device mounted on the vehicle (Yes in step S101), the process proceeds to step S103. When the controller 14 does not detect any abnormality (No in step S101), the process proceeds to step S107.

When the vehicle is traveling in the normal mode (Yes in step S103), the process proceeds to step S105. When the vehicle is traveling in the eco-mode (No in step S103), the process proceeds to step S107.

In step S105, the controller 14 switches from the normal mode to the eco-mode. The controller 14 then stops the internal combustion engine 18. The process then proceeds to step S107. When the pressure difference between the atmospheric pressure and the intake manifold negative pressure is the predetermined threshold or lower (Yes in step S107), the process proceeds to step S109, and the controller 14 sets the maximum drive force of the drive motor 22 to zero (refer to FIG. 4). When the pressure difference is greater than the predetermined threshold (No in step S107), the process ends.

<Operational Effects>

As described above, the vehicle control device 1 according to the present embodiment can achieve the following operational effects.

The drive motor 22 is connected to the rotation shafts of the wheels. The battery 21 supplies the electricity to the drive motor 22. The internal combustion engine 18 is connected to the drive motor 22. The vehicle is equipped with, as traveling modes, the normal mode, and the eco-mode having a larger regenerative braking force than the normal mode obtained such that the rotational energy of the wheels is converted into the electrical energy. The vehicle control device 1, when detecting an abnormality at least in the internal combustion engine 18 during traveling of the vehicle, stops the internal combustion engine 18 to switch from the normal mode to the eco-mode. Since the regenerative braking force set in the eco-mode is greater than the regenerative braking force set in the normal mode, the vehicle is stopped within a short period of time. In addition, since the regenerative braking force set in the eco-mode is larger as described above, the frequency in use of the mechanical brake for stopping the vehicle is less in the eco-mode than in the normal mode. The eco-mode thus suppresses a decrease in the pressure difference between the atmospheric pressure and the intake manifold negative pressure, as compared with the normal mode. This enables the driver to stop the vehicle within a short period of time with the mechanical brake under the condition in which the generative braking force is controlled because of an increase in remaining capacity (SOC: state of charge) of the battery 21 (for example, substantially the maximum capacity) in the middle point before stopping, for example. This effect is achieved because the performance of the mechanical brake is ensured regardless of whether the internal combustion engine 18 is stopped, since the decrease in the pressure difference is suppressed in the eco-mode as compared with the normal mode, as described above. The vehicle control device 1 may indicate and urge the driver to use the mechanical brake through a speaker and the like in the middle point before stopping, namely, when the SOC of the battery 21 reaches a predetermined value or greater. This enables the vehicle to be stopped within a short period of time.

The vehicle includes the mechanical brake operated by use of the intake manifold negative pressure of the internal combustion engine 18. The vehicle control device 1 sets the maximum drive force of the drive motor 22 to zero when the pressure difference between the atmospheric pressure and the intake manifold negative pressure is the predetermined value or lower. Since the vehicle in this state does not start moving if the driver steps on the accelerator pedal 11, the vehicle is prevented from moving and is urged to be stopped.

FIG. 2 illustrates the case of switching from the normal mode to the eco-mode, but the present embodiment is not limited to this case. For example, when an abnormality is detected in the vehicle during traveling in the normal mode, the vehicle control device 1 may increase the regenerative braking force more than that before the detection of the abnormality without switching from the normal mode to the eco-mode (namely, while keeping the normal mode). For example, when the abnormality is detected in the case illustrated in FIG. 2, the vehicle control device 1 may change the maximum regenerative braking force A to the maximum regenerative braking force B while keeping the normal mode. The vehicle control device 1 thus can stop the vehicle within a short period of time without switching from the normal mode to the eco-mode.

Figure 7:
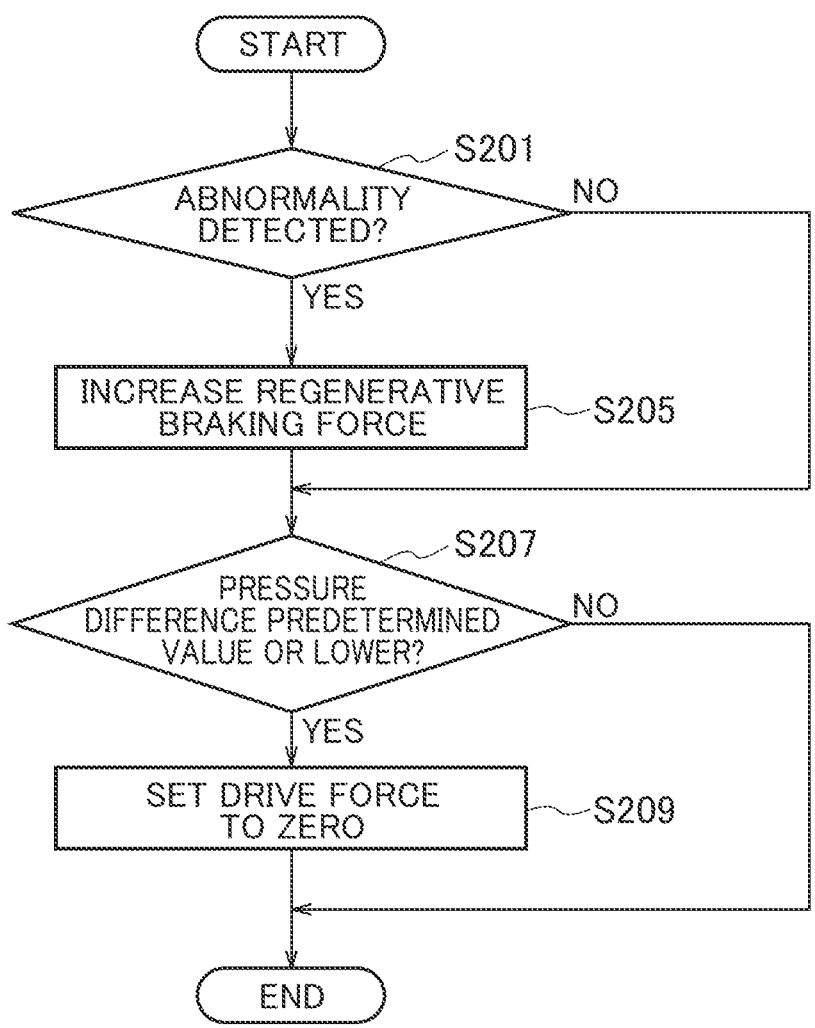
FIG. 7 is a flowchart explaining another example of operation of the vehicle control device.

An example of this operation is described below with reference to the flowchart shown in FIG. 7. The process in steps S201, S207, and S209 is the same as that in steps S101, S107, and S109, and overlapping explanations are not repeated below.

In step S205, the vehicle control device 1 stops the internal combustion engine 18, and increases the regenerative braking force more than that before the abnormality is detected. This process can achieve the same effects as described above.

Modified Example

A modified example of the present embodiment is described below with reference to FIG. 8.

Figure 8:
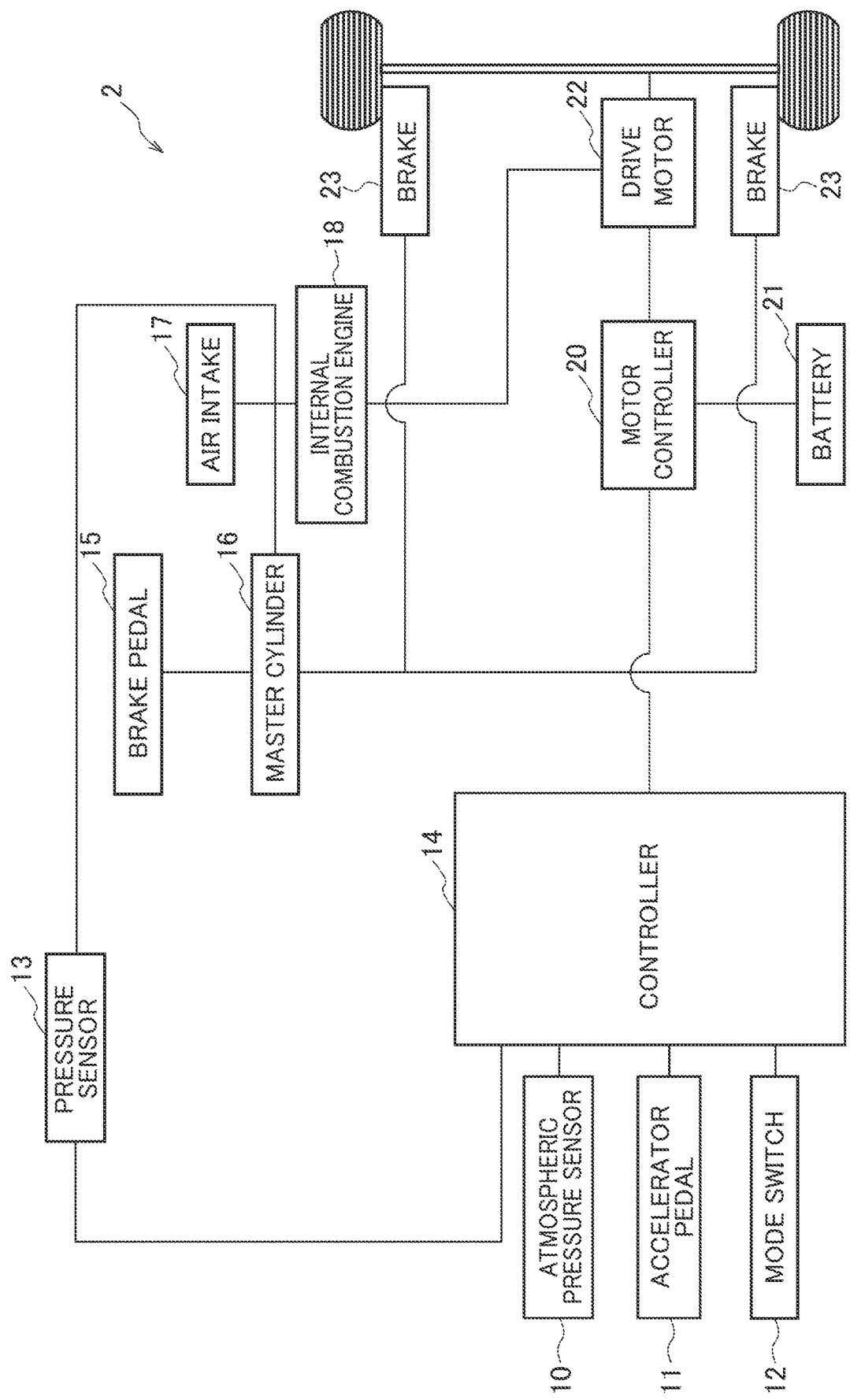
FIG. 8 is a schematic configuration diagram of a vehicle control device according to a modified example of the present invention.

As illustrated in FIG. 8, the internal combustion engine 18 is mechanically connected to the drive motor 22 in a vehicle control device 2 according to the modified example. In particular, the internal combustion engine 18 is mechanically connected to the drive motor 22 via a clutch. The battery 21 is electrically connected to the drive motor 22. The other configurations and controlling operations are the same as those in the above embodiment, and overlapping explanations are not repeated below.

The vehicle control device 2 according to the modified example can separate the internal combustion engine 18 from the drive system, so that the controller 14 can suitably use the respective drive sources of the internal combustion engine 18 and the drive motor 22. This configuration enables the efficient driving depending on the situations, such as traveling only by use of the drive motor 22 and acceleration by use of both the internal combustion engine 18 and the drive motor 22. The processing after detecting an abnormality is the same as that in the embodiment described above, so as to stop the vehicle within a short period of time.

The respective functions described in the above embodiment can be implemented in single or plural processing circuits. The respective processing circuits include a programmed processing device, such as a processing device including an electric circuit. The respective processing circuits include an application-specific integrated circuit (ASIC) configured to execute the functions described above, and a device such as a circuit component. The vehicle control device 1 and the vehicle control device 2 can improve the functions of the computer.

While the present invention has been described above by reference to the embodiment, it should be understood that the present invention is not intended to be limited to the descriptions and the drawings composing part of this disclosure. Various alternative embodiments, examples, and technical applications will be apparent to those skilled in the art according to this disclosure.

While the embodiment has been illustrated above with the case in which the vehicle is equipped with the two modes (the normal mode and the eco-mode), the vehicle is not limited to the two modes. The vehicle may further have a third mode (an S-mode). A difference between the normal mode, the eco-mode, and the S-mode is described below with reference to FIG. 9.

As illustrated in FIG. 9, the regenerative braking force set in the eco-mode and in the S-mode is greater than the regenerative braking force set in the normal mode. The regenerative braking force set in the eco-mode is the same as the regenerative braking force set in the S-mode. The responsiveness of the drive force is the fastest in the S-mode, and the slowest in the eco-mode. The normal mode is set between the S-mode and the eco-mode.

When the traveling mode is the S-mode before detecting an abnormality, the vehicle control device 1 switches from the S-mode to the eco-mode after detecting the abnormality. Since the regenerative braking force set in the eco-mode is the same as the regenerative braking force set in the S-mode (and is greater than the regenerative braking force set in the normal mode), the vehicle is stopped within a short period of time. In addition, since the responsiveness of the drive force set in the eco-mode is slower than the responsiveness of the drive force set in the S-mode, the vehicle is prevented from moving and is urged to be stopped.

In the embodiment described above, the connection between the drive motor 22 and the internal combustion engine 18 includes the mechanical connection and the indirect connection. The term "indirect connection" refers to a state in which the drive motor 22 is connected to the internal combustion engine 18 via the power generator 19, as illustrated in FIG. 1.

The present invention may also be expressed as follows. An aspect of the present invention is a vehicle control method of controlling a vehicle including a drive motor mechanically connected to a rotation shaft of wheels, a power generator that supplies electricity to the drive motor, a battery that supplies electricity to the drive motor or the power generator, and an internal combustion engine mechanically connected to the power generator, the vehicle being equipped with, as traveling modes, a normal mode, and an eco-mode having a larger regenerative braking force than the normal mode obtained such that rotational energy of the wheels is converted into electrical energy, the method including stopping the internal combustion engine and switching from the normal mode to the eco-mode when detecting at least one of an abnormality in the internal combustion engine, an abnormality in the power generator, and an abnormality in a connecting mechanism mechanically connecting the internal combustion engine and the power generator during traveling of the vehicle.

REFERENCE SIGNS LIST 1, 2 VEHICLE CONTROL DEVICE
10 ATMOSPHERIC PRESSURE SENSOR
11 ACCELERATOR PEDAL
12 MODE SWITCH
13 PRESSURE SENSOR
14 CONTROLLER
15 BRAKE PEDAL
16 MASTER CYLINDER
17 AIR INTAKE
18 INTERNAL COMBUSTION ENGINE
19 POWER GENERATOR
20 MOTOR CONTROLLER
21 BATTERY
22 DRIVE MOTOR
23 BRAKE

The invention claimed is:

1. A vehicle control method of controlling a vehicle including a drive motor connected to a rotation shaft of wheels, a battery that supplies electricity to the drive motor, a power generator, for charging the battery, and an internal combustion engine connected to the power generator,
the vehicle being equipped with, as traveling modes, a normal mode, and an eco-mode having a larger regenerative braking force than the normal mode obtained such that rotational energy of the wheels is converted into electrical energy,
the method comprising:
stopping the internal combustion engine and switching from the normal mode to the eco-mode when detecting at least an abnormality in the internal combustion engine during traveling of the vehicle, and
disabling switching from the eco-mode to the normal mode by a mode switch when the abnormality is detected,
wherein a maximum drive force of the drive motor is set to be lower for the eco-mode than for the normal mode.

2. A vehicle control method of controlling a vehicle including a drive motor connected to a rotation shaft of wheels, a battery that supplies electricity to the drive motor, a power generator for charging the battery, and an internal combustion engine connected to the power generator, the method comprising;
when detecting at least an abnormality in the internal combustion engine during traveling of the vehicle, stopping the internal combustion engine and increasing a regenerative braking force obtained such that rotational energy of the wheels is converted into electrical energy more than the regenerative braking force before detecting the abnormality, and
disabling switching from an eco-mode to a normal mode by a mode switch when the abnormality is detected,
wherein a maximum drive force of the drive motor after detecting the abnormality is lower than before detecting the abnormality.

3. The vehicle control method according to claim 1, wherein:
the vehicle further includes a brake including a mechanical brake operated by use of an intake manifold negative pressure of the internal combustion engine; and
the method sets a maximum drive force of the drive motor to zero when a pressure difference between an atmospheric pressure and the intake manifold negative pressure is a predetermined value or lower.

4. The vehicle control method according to claim 1, wherein:
the vehicle is further equipped with an S-mode as an other traveling mode;
the S-mode has the same regenerative braking force as the eco-mode, and has a greater drive force of the drive motor than the eco-mode; and
the method stops the internal combustion engine and switches from the S-mode to the eco-mode when detecting an abnormality in a device mounted on the vehicle during traveling of the vehicle.

5. A vehicle control device for controlling a vehicle including a drive motor connected to a rotation shaft of wheels, a battery that supplies electricity to the drive motor, a power generator for charging the battery and an internal combustion engine connected to the power generator,
the vehicle being equipped with, as traveling modes, a normal mode, and an eco-mode having a larger regenerative braking force than the normal mode obtained such that rotational energy of the wheels is converted into electrical energy,
the device comprising:
a controller configured to stop the internal combustion engine and switch from the normal mode to the eco-mode when detecting at least an abnormality in the internal combustion engine during traveling of the vehicle, and
a mode switch which is disabled from switching from the eco-mode to the normal mode when the abnormality is detected,
wherein a maximum drive force of the drive motor is set to be lower for the eco-mode than for the normal mode.

6. A vehicle control device for controlling a vehicle including a drive motor connected to a rotation shaft of wheels, a battery that supplies electricity to the drive motor, a power generator for charging the battery and an internal combustion engine connected to the power generator,
the device comprising:
a controller configured to, when detecting at least an abnormality in the internal combustion engine during traveling of the vehicle, stop the internal combustion engine and increase a regenerative braking force obtained such that rotational energy of the wheels is converted into electrical energy more than the regenerative braking force before detecting the abnormality, and
a mode switch which is disabled from switching from an eco-mode to a normal mode when the abnormality is detected,
wherein a maximum drive force of the drive motor after detecting the abnormality is lower than before detecting the abnormality.

* * * * *